(12) United States Patent
Hyodo et al.

(10) Patent No.: US 10,437,086 B2
(45) Date of Patent: Oct. 8, 2019

(54) FLEXIBLE DISPLAY DEVICE COMPRISING A BENDABLE SECTION IN A PART OF A SEALANT

(71) Applicant: Japan Display Inc., Tokyo (JP)

(72) Inventors: Yosuke Hyodo, Tokyo (JP); Shinichiro Oka, Tokyo (JP); Lu Jin, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/877,674

(22) Filed: Jan. 23, 2018

(65) Prior Publication Data

US 2018/0231823 A1    Aug. 16, 2018

(30) Foreign Application Priority Data

Feb. 13, 2017 (JP) ................. 2017-023886

(51) Int. Cl.
| | |
|---|---|
| *G02F 1/1333* | (2006.01) |
| *G02F 1/1339* | (2006.01) |
| *G02F 1/1345* | (2006.01) |
| *G02F 1/1362* | (2006.01) |

(52) U.S. Cl.
CPC ...... *G02F 1/133305* (2013.01); *G02F 1/1339* (2013.01); *G02F 1/13458* (2013.01); *G02F 1/133345* (2013.01); *G02F 1/1345* (2013.01); *G02F 1/136286* (2013.01); *G02F 2001/13456* (2013.01); *G02F 2001/133388* (2013.01)

(58) Field of Classification Search
CPC ....... G02F 1/13305; G02F 2001/13456; G02F 1/13458; G02F 2001/133388
See application file for complete search history.

(56) References Cited

U.S. PATENT DOCUMENTS

| | | | | |
|---|---|---|---|---|
| 5,273,475 A | * | 12/1993 | Oshikawa | ......... G02F 1/133305 156/163 |
| 2009/0161048 A1 | * | 6/2009 | Satake | ............. G02F 1/133305 349/110 |
| 2010/0238098 A1 | * | 9/2010 | Watanabe | ............. G02F 1/1339 345/87 |
| 2011/0007042 A1 | | 1/2011 | Miyaguchi | |

(Continued)

FOREIGN PATENT DOCUMENTS

| | | | | |
|---|---|---|---|---|
| JP | 2013015835 A | * | 1/2013 | ............... G09F 9/33 |
| JP | 2014-206760 A | | 10/2014 | |

*Primary Examiner* — Paul C Lee
(74) *Attorney, Agent, or Firm* — Michael Best & Friedrich LLP

(57) ABSTRACT

A display device includes a flexible first substrate, a flexible second substrate, a first layer, a first insulating layer in contact with the first layer, a second insulating layer in contact with the first layer, a liquid crystal layer between the first substrate and the second substrate, and a sealant sealing the liquid crystal layer and bonding the first substrate and the second substrate. The display device is bendable in a region inner to the sealant, the first substrate includes a seal region overlapping the sealant and a liquid crystal region overlapping the liquid crystal layer, the first insulating layer is in contact with the first layer in the seal region, the second insulating layer is in contact with the first layer in the liquid crystal region, and the first insulating layer and the second insulating layer have different thicknesses or are formed of different materials.

5 Claims, 14 Drawing Sheets

(56) References Cited

U.S. PATENT DOCUMENTS

| | | | |
|---|---|---|---|
| 2013/0077033 A1* | 3/2013 | Li | G02F 1/1333 |
| | | | 349/122 |
| 2014/0065430 A1* | 3/2014 | Yamazaki | H01L 27/1214 |
| | | | 428/426 |
| 2014/0226111 A1* | 8/2014 | Kim | G02F 1/133305 |
| | | | 349/96 |
| 2014/0226112 A1* | 8/2014 | Kim | G02F 1/133305 |
| | | | 349/96 |
| 2014/0368782 A1* | 12/2014 | Kim | G02F 1/133305 |
| | | | 349/153 |
| 2016/0093685 A1* | 3/2016 | Kwon | H01L 27/3276 |
| | | | 257/40 |

\* cited by examiner

FIG. 4
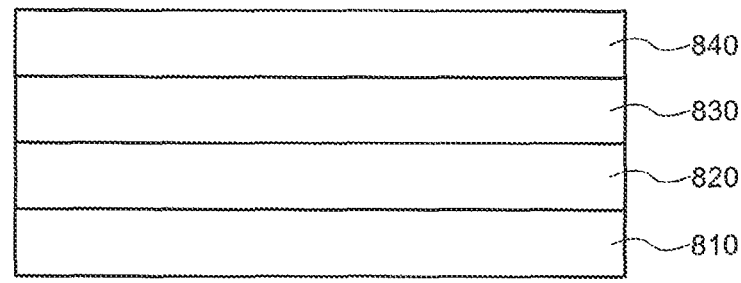
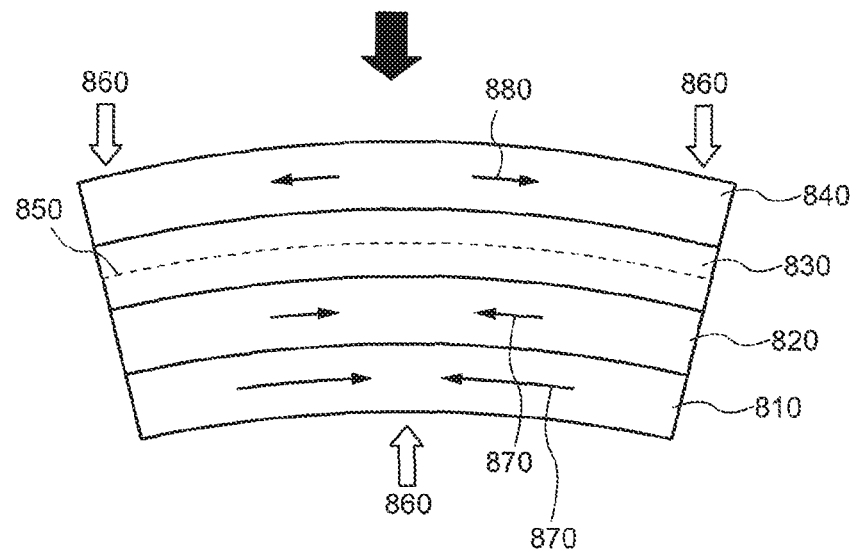

US 10,437,086 B2

FLEXIBLE DISPLAY DEVICE COMPRISING A BENDABLE SECTION IN A PART OF A SEALANT

CROSS REFERENCE TO RELATED APPLICATIONS

This application is based upon and claims the benefit of priority from the prior Japanese Patent Application No. 2017-023886 filed on Feb. 13, 2017, the entire contents of which are incorporated herein by reference.

FIELD

The present invention relates to a display device, and specifically, to a liquid crystal display device including a flexible substrate.

BACKGROUND

A flexible display is expected to be used in a wide range from a mobile bendable display to a large screen display. A flexible display is strongly desired to be realized as a next-generation display that is lightweight and is easily accommodated. Especially, a liquid crystal display element is applicable to both of a transmission-type display system and a reflection-type display system, and thus has a possibility of being applied to a flexible display that provides superb visible recognizability in any of various illumination environments.

A flexible substrate has an advantage of allowing a bezel (frame section that is other than a display screen and is visually recognized by a viewer) of a display device, including the flexible substrate, to be reduced in size. For example, Japanese Laid-Open Patent Publication No. 2014-206760 discloses a display device in which a substrate is bended in both a display region and a wiring region connecting driving circuits, so that the driving circuits are located on a rear surface of the display region. In addition, in order to reduce the size of the bezel, it has recently been studied to bend the display device in a display region such that the bezel is not visually recognized by the viewer.

In a liquid crystal display device, a liquid crystal layer is enclosed by a sealant. In the liquid crystal display device, a pixel circuit is located in a liquid crystal region (region overlapping the liquid crystal layer as seen in a plan view), and a pixel selection circuit is located in a seal region (region overlapping the sealant as seen in a plan view). The pixel circuit and the pixel selection circuit are connected, via a wire, with a connection terminal provided in a terminal region outer to the sealant. The pixel circuit is connected with an external circuit via the connection terminal. In a state where the liquid crystal display device having the above-described structure is bended in a display region, the wire provided in both of the liquid crystal region and the seal region is bended. Since the liquid crystal region and the seal region have different layer structures, a portion of the wire in the liquid crystal region and a portion of the wire in the seal region are subjected to different levels of stress. When the display device is used while a strong stress is applied to the wire, the wire may be broken to decrease the reliability of the display device. Therefore, the stress applied to the wire needs to be alleviated. However, it has been difficult to alleviate the stress applied to the wire located both in the liquid crystal region and the seal region.

SUMMARY

A display device in an embodiment according to the present invention includes a flexible first substrate, a flexible second substrate, a first layer, a first insulating layer in contact with the first layer, a second insulating layer in contact with the first layer, a liquid crystal layer between the first substrate and the second substrate, and a sealant sealing the liquid crystal layer and bonding the first substrate and the second substrate to each other. The display device is bendable in a region inner to the sealant in a plan view, the first substrate includes a seal region overlapping the sealant and a liquid crystal region overlapping the liquid crystal layer, the first insulating layer is in contact with the first layer in the seal region, the second insulating layer is in contact with the first layer in the liquid crystal region, and the first insulating layer and the second insulating layer have different thicknesses or are formed of different materials from each other.

BRIEF DESCRIPTION OF DRAWINGS

FIG. 4 shows a neutral face in an embodiment according to the present invention;

DESCRIPTION OF EMBODIMENTS

Figure 1:
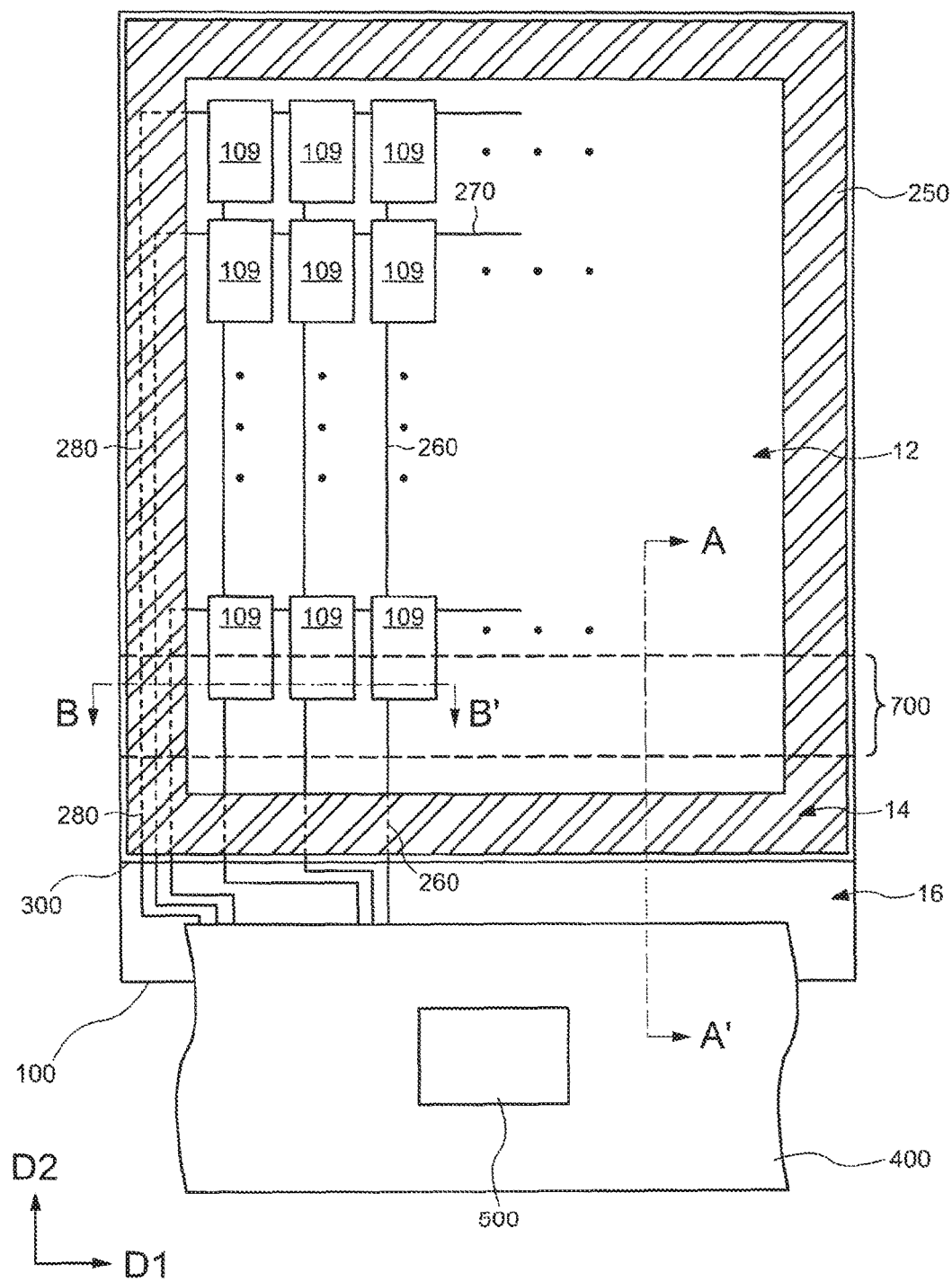
FIG. 1 is a plan view showing an overall structure of a liquid crystal display device in an embodiment according to the present invention.

Hereinafter, embodiments of the present invention will be described with reference to the drawings. The disclosure merely provides examples, and alternations and modifications easily conceivable by a person of ordinary skill in the art without departing from the gist of the present invention are duly encompassed in the scope of the present invention. In the drawings, components may be shown schematically regarding the width, thickness, shape and the like, instead of being shown in accordance with the actual sizes, for the sake of clear illustration. The drawings merely show examples and do not limit the interpretations of the present invention in any way. In the specification and the drawings, components that are substantially the same as those shown in a previous drawing(s) bear the identical reference signs with alphabetical letters, and detailed descriptions thereof may be omitted.

In the embodiments of the present invention, a direction from an array substrate, having a transistor provided thereon, toward a counter substrate facing the array substrate is referred to as "above" or "upward". By contrast, a direction from the counter substrate toward the array substrate is referred to as "below" or "downward". For the sake of explanation, the term "up", "down", "above", "below" or the like may be used to describe a direction in this manner. However, for example, a first member and a second member may be located so as to have an opposite positional relationship in the up-down direction. In the following description, an expression that "second member on (above, under or below) the first member" merely describes a positional relationship between the first member and the second member in the up-down direction. The expression represents a concept encompassing a case where another component is provided between the first member and the second member.

The terms "inner" and "outer" represent a relative positional relationship between two sections with respect to a display section. An expression that "one of two sections is "inner" to the other section" indicates that the one section is closer to the display section than the other section, and an expression that "one of two sections are "outer" to the other section" indicates that the one section is farther from the display section than the other section is. It should be noted that the terms "inner" and "outer" are defined in a state where the display device is not bended.

The term "display device" refers to a structural body that displays a video by use of an electro-optical layer. For example, the "display device" may refer to a display cell including an electro-optical layer or may refer to a structural body including the display cell and another optical member (e.g., polarization member, backlight unit, touch panel, etc.) attached to the display cell. The "electro-optical layer" may include a liquid crystal layer, an electroluminescence (EL) layer, an electrochromic (EC) layer and an electrophoretic layer, unless any technological contradiction occurs. In the following embodiments, a liquid crystal display device will be described as an example of display device. Nonetheless, the present invention is also applicable to any other type of display device including any other electro-optical layer as described above.

In this specification, the expressions that "α includes A, B or C", "α includes any of A, B and C", and "α includes one selected from the group consisting of A, B and C" do not exclude a case where α includes a plurality of combinations of A to C, unless otherwise specified. The above expressions do not exclude a case where α includes an element other than A, B and C.

The following embodiments have an object of providing a highly reliable display device.

Embodiment 1

With reference to FIG. 1 to FIG. 5, an overview of a liquid crystal display device in embodiment 1 according to the present invention will be described. In embodiment 1, the liquid crystal display device (LCD) is used as an example of display device. It should be noted that the present invention is applicable to display devices such as an organic EL device (Organic Light-Emitting Diode: OLED), an electronic paper device and the like in addition to the liquid crystal display device.

[Structure of the Display Device 10]

FIG. 1 is a plan view showing an overall structure of a liquid crystal display device 10 in embodiment 1 according to the present invention. As shown in FIG. 1, the display device 10 includes an array substrate 100, a sealant 250, a counter substrate 300, a flexible printed circuit (FPC) 400, and an IC chip 500. The array substrate 100 and the counter substrate 300 are bonded to each other with the sealant 250. A liquid crystal region 12 enclosed by the sealant 250 includes a plurality of pixel circuits 109 arrayed in a matrix. The liquid crystal region 12 overlaps a liquid crystal layer 240 described below as seen in a plan view. A seal region 14 overlapping the sealant 250 as seen in a plan view is around the liquid crystal region 12. The FPC 400 and the IC chip 500 are provided in a terminal region 16. The terminal region 16 is a part of the array substrate 100 exposed from the counter substrate 300, and is outer to the seal region 14. The expression "outer to the seal region 14" refers to "outer to the region enclosed by the sealant 250". The IC chip 500 is provided on the FPC 400. The IC chip 500 supplies a signal driving each of the pixel circuits 109.

The pixel circuits 109 are each connected with a source wire 260 and a gate wire 270. The source wires 260 extend in a D2 direction and are connected with source wire selection circuits located in a region overlapping the sealant 250. The gate wires 270 extend in a D1 direction and are connected with gate wire selection circuits located in a region the overlapping the sealant 250. For the sake of explanation, FIG. 1 omits the gate wire selection circuits and the source wire selection circuits. The source wires 260 pass the sealant 250 to be connected with the FPC 400. The gate wires 270 are connected with the FPC 400 via wires 280 extending in the D2 direction. The wires 280 include a wire connecting the gate wire selection circuits adjacent to each other. Namely, the source wires 260 extend in the D2 direction in the liquid crystal region 12, and the wires 280 extend in the D2 direction in the seal region 12. The source wires 260 and the wires 280 are connected with the FPC 400 via an anisotropic conductive film or the like in the terminal region 16.

The array substrate 100 (first substrate) and the counter substrate 300 (second substrate) are both flexible. The display device 10 is bendable along a bendable section 700. The display device 100 is flat in a region other than the bendable section 700. The bendable section 700 includes a part of the liquid crystal region 12. Namely, the display device 10 is bendable in a region inner to the sealant 250. In other words, at least one of the pixel circuits 109, the source wires 260 and the wires 280 are provided in the bendable section 700 in addition to the region other than the bendable section 700. In still other words, bendable section 700 is bendable around the D1 direction as an axis.

The IC chip 500 supplies a video signal and a driving signal. The video signal is supplied to a pixel electrode of each of the pixel circuits 109. The driving signal controls a pixel selection transistor in each of the pixel circuits 109. FIG. 1 shows an example in which the IC chip 500 is provided on the FPC 400 in order to control the pixel selection transistor included in each pixel circuit 109. Alternatively, a driving circuit including a thin film transistor such as a gate driver circuit, a source driver circuit or the like may be provided in the seal region 14. The IC chip 500 may be provided on the terminal region 16 of the array substrate 100 by a COG (Chip On Glass) method.

For the sake of explanation, FIG. 1 omits a polarization member and an optical member such as a backlight unit or the like. The polarization member and the optical member will be described below.

Figure 2:
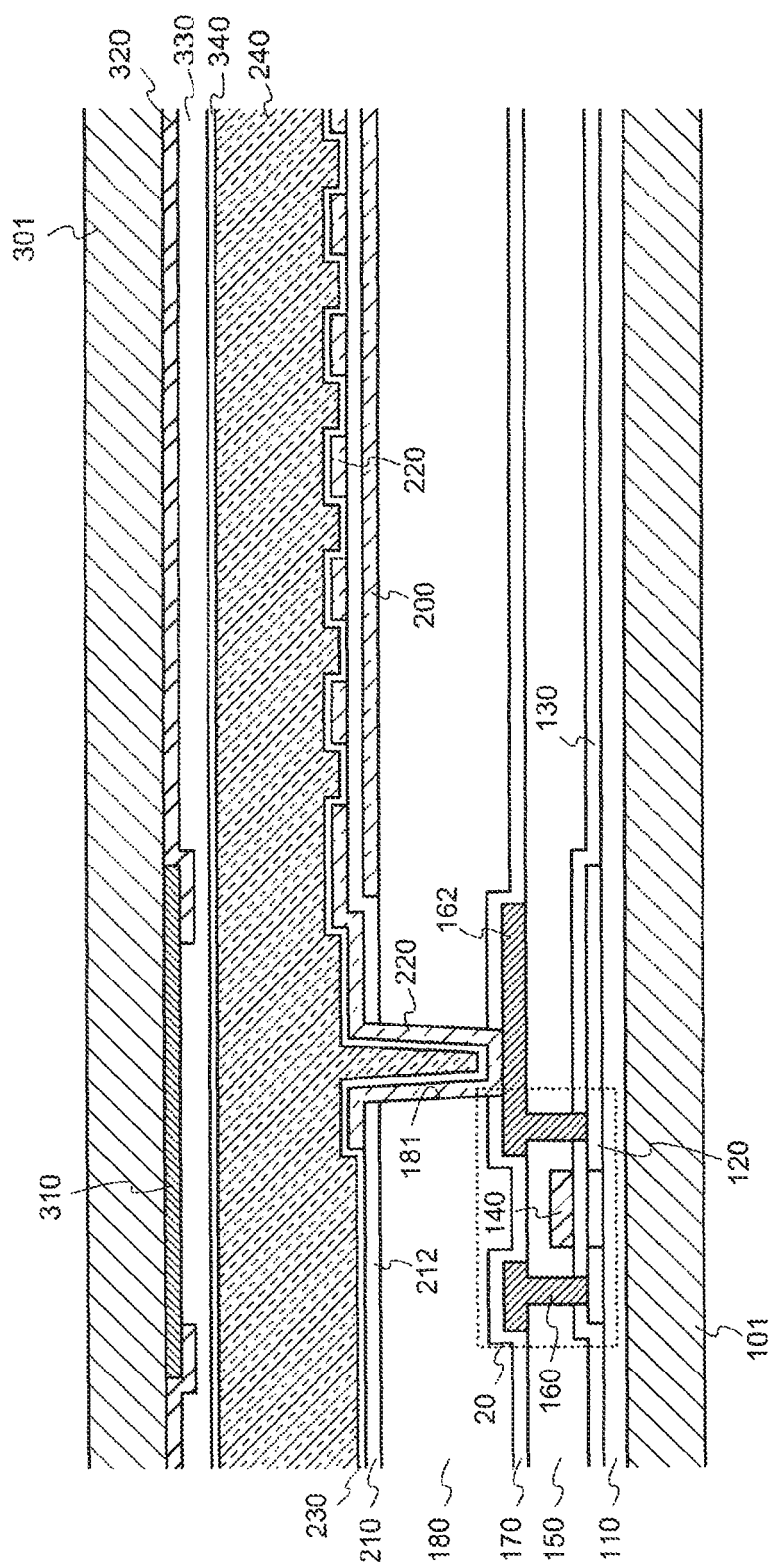
FIG. 2 is a cross-sectional view showing a pixel structure of the liquid crystal display device in an embodiment according to the present invention.

FIG. 2 is a cross-sectional view showing a pixel structure of the display device 10 (liquid crystal display device) in embodiment 1. A resin substrate 101 contains a resin material such as polyimide or the like. As shown in FIG. 2, on the resin substrate 101, an underlying insulating layer 110 containing an inorganic insulating material is provided. On the underlying insulating layer 110, a thin film transistor 20 is provided. The thin film transistor 20 includes a semiconductor layer 120, a gate insulating layer 130, a gate electrode 140, an interlayer insulating layer 150, a source electrode 160, and a drain electrode 162. These components may each be formed of a known material.

On the thin film transistor 20, an inorganic insulating layer 170 containing an inorganic material such as silicon oxide or the like is provided. On the inorganic insulating layer 170, a resin insulating layer 180 containing a resin material such as an acrylic resin or the like is provided. The resin insulating layer 180 flattens ruggedness caused by the thin film transistor 20. On the resin insulating layer 180, a common electrode 200 containing a transparent conductive film such formed of ITO (Indium Tin Oxide) or the like is provided. On the common electrode 200, a pixel electrode 220 is provided with an insulating layer 210 being provided between the common electrode 200 and the pixel electrode 220.

The insulating layer 210 may be formed of an inorganic insulating film such as, for example, a silicon oxide film, a silicon nitride film or the like, but is not limited to being formed of such a material. The pixel electrode 220 contains a transparent conductive film such as ITO or the like, like the common electrode 200. The pixel electrode 220 is electrically connected with the drain electrode 162 via a contact hole 181 provided in the resin insulating layer 180 and the insulating layer 210. FIG. 2 shows a plurality of sections of the pixel electrode 220. The pixel electrode 220 has a comb-like pattern as seen in a plan view. More specifically, as seen in a plan view, the pixel electrode 220 includes a plurality of linear electrodes located side by side, which are connected to each other at one ends thereof. In this embodiment, an electric field (referred to as "transverse electric field") is formed between the common electrode 200 and the pixel electrode 220, and the electric field controls alignment of liquid crystal molecules in the liquid crystal layer 240. Such a liquid crystal display system is referred to as an "IPS (In-plane Switching)" system. Among several IPS systems, a system in which the pixel electrode 220 and the common electrode 200 are stacked on each other as shown in FIG. 2 is referred to as an "FFS (Fringe Field Switching)" system.

According to the IPS system, a transverse electric field may be formed by use of a pixel electrode and a common electrode provided in the same layer. As a liquid crystal display system, a VA (Vertical Alignment) system may be used. According to the VA system, a vertical electric field is formed between a pixel electrode provided in an array substrate and a common electrode provided in a counter substrate, and the vertical electric field controls the alignment of liquid crystal molecules.

On the pixel electrode 220, an alignment film 230 is provided. In this embodiment, the resin substrate 101, the alignment film 230 and the components provided between the resin substrate 101 and the alignment film 230 are collectively referred to as the "array substrate 100" (FIG. 1).

On the alignment film 230, the liquid crystal layer 240 is provided. The liquid crystal layer 240 is retained by being enclosed by the sealant 250 between the array substrate 100 and the counter substrate 300. Namely, the liquid crystal layer 240 is sealed by the sealant 250 between the array substrate 100 and the counter substrate 300.

On a light blocking member 310 and a color filter member 320, a resin substrate 301 containing a resin material such as polyimide or the like is provided. In an actual production process, the light blocking member 310, the color filter member 320, an overcoat layer 330 and an alignment film 340 are stacked on one surface of the resin substrate 301, and thus the counter substrate 300 (FIG. 1) is formed. In order to improve the moisture resistance, an inorganic insulating film formed of silicon nitride, silicon oxide or the like may be provided between the resin substrate 301 and the color filter member 320.

Figure 3:
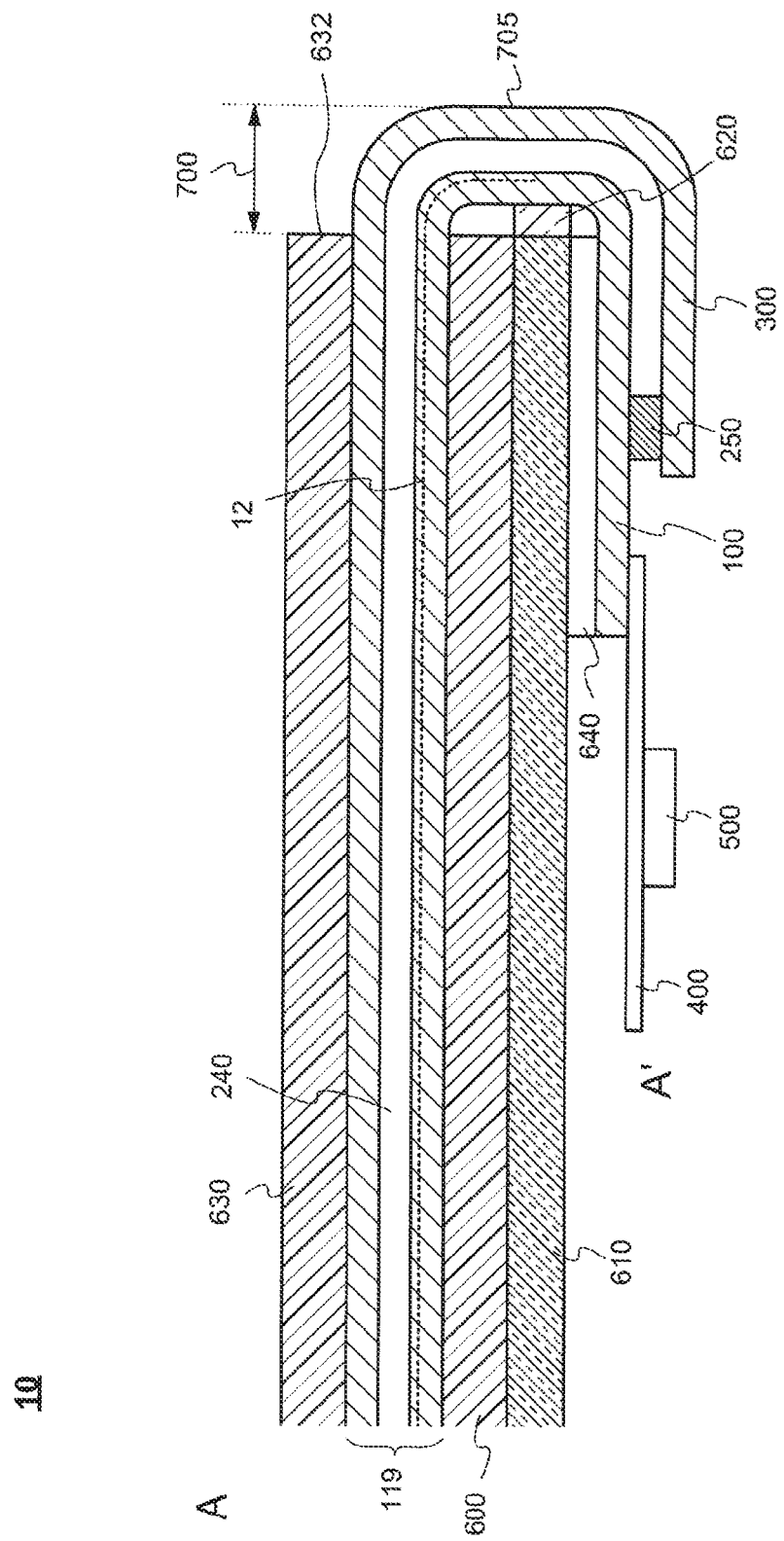
FIG. 3 is a cross-sectional view of the liquid crystal display device in a bended state.

FIG. 3 is a cross-sectional view of the display device 10 (liquid crystal display device) in embodiment 1 according to the present invention in a bended state. Specifically, FIG. 3 is a cross-sectional view taken along line A-A' in FIG. 1, and shows the display device 10 bended along the bendable section 700. Referring to FIG. 3, among two surfaces of the array substrate 100, a surface facing the counter substrate 300 is defined as a "front surface of the array substrate 100", and the opposite surface is defined as a "rear surface of the array substrate 100". Similarly, among two surfaces of the counter substrate 300, a surface facing the array substrate 100 is defined as a "front surface of the counter substrate 300", and the opposite surface is defined as a "rear surface of the counter substrate 300". Therefore, the liquid crystal layer 240 is retained by being held between the front surface of the array substrate 100 and the front surface of the counter substrate 300, inner to the sealant 250. In the following description, an assembly of the array substrate 100, the counter substrate 300, the liquid crystal layer 240 and the sealant 250 will be referred to as a "liquid crystal cell 119".

On the rear surface of the array substrate 100, a polarization member 600, a light guide member 610 and a light source 620 are provided. The polarization member 600, the light guide member 610 and the light source 620 overlap the liquid crystal region 12. The light source 620 is located on a side surface of the light guide member 610. The light guide member 610 and the light source 620 may be collectively referred to as an "illumination device (backlight unit)". On the rear surface of the counter substrate 300, a polarization member 630 is provided. The polarization member 630 is located in substantially the same region as the polarization member 600 as seen in a plan view. Light emitted from the light source 620 is guided to the polarization member 600 by the light guide member 610, and is recognized by a viewer via the liquid crystal cell 119 and the polarization member 630.

The array substrate 100 and the counter substrate 300 are both flexible. Therefore, the liquid crystal cell 119 is bended in a region where neither the polarization member 600 nor the polarization member 630 is located. The region where the liquid crystal cell 119 is bended corresponds to the bendable section 700. As shown in FIG. 3, a state where the liquid crystal cell 119 is bended to face the rear surface of a non-bended section of the array substrate 100 is expressed as that "the liquid crystal cell 119 is bended along the bendable section 700 back to the side of the array substrate 100". The liquid crystal cell 119 is bended along the bendable section 700 to reach the side opposite to the polarization member 600 with respect to the light guide member 610. The liquid crystal cell 119 is connected with the light guide member 610 via an insulating layer 640 on the side opposite to the polarization member 600. The insulating layer 640 is a resin layer. The insulating layer 640 suppresses the rear surface of the array substrate 100 and the light guide member 610 from directly contacting each other. Namely, the insulating layer 640 acts as a cushioning member. The insulating layer 640 may be omitted.

As described above, the liquid crystal cell 119 is bended in the region inner to the sealant 250. Specifically, the liquid crystal cell 119 is bended along the bendable section 700 shown in FIG. 1. Therefore, a part of the sealant 250 is located at a rear side of the display device 10. In other words, such a part of the sealant 250 faces the rear surface of the non-bended section of the array substrate 100. In still other words, the sealant 250 and the liquid crystal region 12 overlap each other as seen in a plan view. In still other words, the light guide member 610 is located between the sealant 250 and the liquid crystal region 12 as seen in a cross-sectional view.

In this embodiment, a part of the liquid crystal cell 119 that overlaps neither the polarization member 600 nor the polarization member 630 is bended. Therefore, as shown in FIG. 3, the bendable section 700 of the display device 10 slightly protrudes from an edge 632 of the polarization member 630 as seen in a plan view. In this state, an end of the bendable section 700 that is visually recognizable by the viewer is defined as a "virtual end 705". Namely, the bendable section 700 refers to a part of the liquid crystal cell 119 that is from the edge 632 of the polarization member 630 to the virtual end 705 as seen in a plan view.

In this embodiment, the polarization member 600 and the polarization member 630 are formed of a material harder than that of the array substrate 100 and the counter substrate 300. Therefore, the polarization member 600 and the polarization member 630 are not bent to be fully folded. Therefore, an end of the optical member (e.g., the edge 632 of the polarization member 630) is inner to the bendable section 700. A state where the end of the optical member slightly overlaps the bendable section 700 may be expressed as that "the end of the optical member is inner to the bendable section 700".

In this embodiment, the polarization members 600 and 630 and the illumination device are attached as the optical members to the liquid crystal cell 119. Another optical member (phase plate, reflection preventive plate, etc.) or a touch panel may be attached to the liquid crystal cell 119. Such optical members and the touch panel may each be formed of a known member or may each have a known structure.

[Description on a Neutral Face]

FIG. 4 shows a neutral face in an embodiment according to the present invention. Referring to FIG. 4, a neutral face 850 will be described with a stack body 800 including a first layer 810, a second layer 820, a third layer 830 and a fourth layer 840 stacked in this order. As shown in FIG. 4, it is assumed that the stack body 800 is curved by an external force 860 such that a central section of the stack body 800 protrudes upward. When this occurs, the first layer 810 and the second layer 820, which are caused to have a recessed portion by the curving, are subjected to a compressive stress 870, which contracts the layers. By contrast, the fourth layer 840, which is caused to have a protruding portion, is subjected to a tensile stress 880, which expands the layer. A face at which the compressive stress 870 and the tensile stress 880 are inverted to each other is the neutral face 850. Ideally, no stress occurs at the neutral face 850. Namely, the wires may be located at positions close to the neutral face 850, so that the wires are prevented from being broken by the stresses.

The position of the neutral face 850 in a thickness direction of the stack body 800 varies in accordance with the layer structure. Specifically, the position of the neutral face 850 in the thickness direction depends on the flexural rigidity. The "flexural rigidity" is the degree at which the size is difficult to be changed (deformed) with respect to the force of bending.

In the bendable section 700 shown in FIG. 3, the liquid crystal cell 119 is subjected to a stress. Specifically, the rear surface of the array substrate 100 is subjected to a compressive stress, and the front surface of the array substrate 100 is subjected to a tensile stress. As shown in FIG. 1, the source wires 260 in the liquid crystal region 12 and the wires 280 in the seal region 14 are located in the bendable section 700. Namely, in the bendable section 700, the source wires 260 and the wires 280 are each subjected to a compress stress or a tensile stress in accordance with the position thereof.

[Problems of the Conventional Technology]

Figure 12:
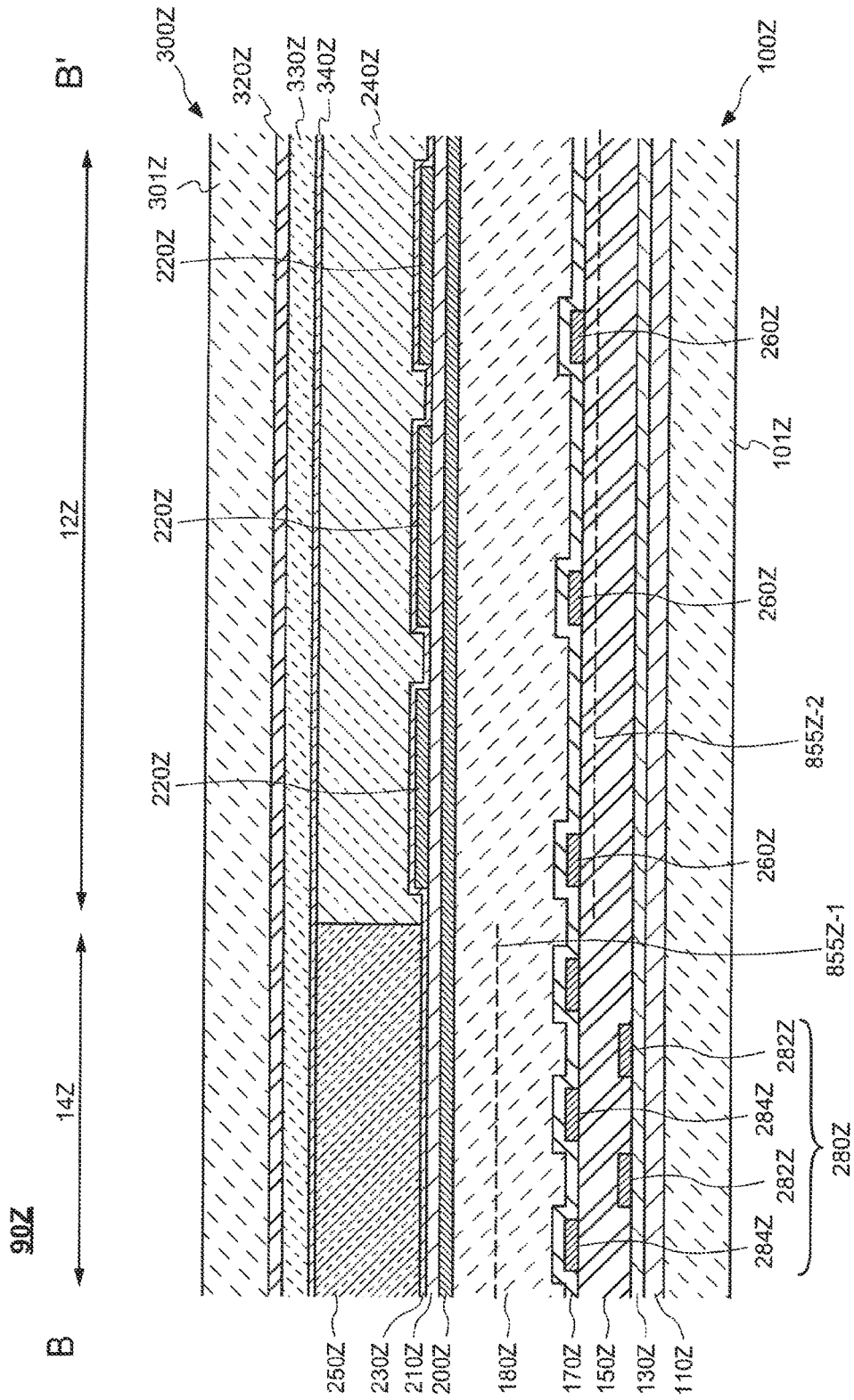
FIG. 12 is a cross-sectional view of a liquid crystal region and a seal region of a bendable section of a conventional liquid crystal display device.

With reference to FIG. 12, a neutral face of a liquid crystal region 12Z and a seal region 14Z in a bendable section in the case where a conventional display device 90Z is bended will be described. FIG. 12 is a cross-sectional view of the liquid crystal region 12Z and the seal region 14Z in the bendable section of the conventional display device 90Z (liquid crystal display device). FIG. 12 corresponds to a cross-sectional view taken along line B-B' in FIG. 1. In FIG. 12, the components are represented by the reference signs with "Z" at the end so as to be distinguished from the components in FIG. 2, but the names of the components in FIG. 12 are the same as those of the components in FIG. 2.

In the liquid crystal region 12Z, a liquid crystal layer 240Z is liquid and is not rigid. Therefore, a neutral face is determined by a structural body including a resin substrate 101Z, an alignment film 230Z and components provided between the resin substrate 101Z and the alignment film 230Z. By contrast, in the seal region 14Z, a neutral face is determined by a structural body including the resin substrate 101Z, a resin substrate 301Z and components provided between the resin substrate 101Z and the resin substrate 301Z. The rigidity of the structural body including the resin substrate 101Z, a resin substrate 301Z and the components provided between the resin substrate 101Z and the resin substrate 301Z in the seal region 14Z is higher than the rigidity of the structural body including the resin substrate 101Z, the alignment film 230Z and the components provided between the resin substrate 101Z and the alignment film 230Z in the liquid crystal region 12Z. Therefore, a neutral face 855Z-1 in the seal region 14Z is closer to the resin substrate 301Z than a neutral face 855Z-2 in the liquid crystal region 12Z. In the example of FIG. 12, the neutral face 855Z-1 is located closer to the resin substrate 301Z than wires 280Z, and the neutral face 855Z-2 is located closer to the resin substrate 101Z than source wires 260Z. In addition, the distance between the neutral face 855Z-1 and the wires 820Z (especially, wires 282Z) is longer than the distance between the neutral face 855Z-2 and the source wires 260Z.

Although not shown in FIG. 12, the display device 90Z is bended to the side of the array substrate 100Z. Since the source wires 260Z are located closer to the resin substrate 301Z than the neutral face 855Z-2, the source wires 260Z are subjected to a tensile stress. By contrast, since the wires 280Z are located closer to the resin substrate 101Z than the neutral face 855Z-1, the wires 280Z (especially, the wires 282Z) are subjected to a compressive stress. As described above, the distance between the neutral face 855Z-1 and the wires 820Z (especially, wires 282Z) is longer than the distance between the neutral face 855Z-2 and the source wires 260Z. Therefore, the stress applied to the wires 280Z is larger than the stress applied to the source wires 260Z.

As described above, in the conventional display device 90Z, the position of the neutral face 855Z-2 in the liquid crystal region 12Z is different from the position of the neutral face 855Z-1 in the seal region 14Z. Therefore, the stress applied to the source wires 260Z and the stress applied to the wires 280Z are different in direction and magnitude. Namely, when the display device 90Z is bended, the source wires 260Z and the wires 280Z are subjected to different levels of stress in the bendable section. In the case where, for example, the stress applied to the wires 280Z is larger than the stress applied to the source wires 260Z as shown in FIG. 12, the wires 280Z are likely to be broken or to have any other defect.

[Structure of the Bendable Section 700 of the Display Device 10]

Figure 5:
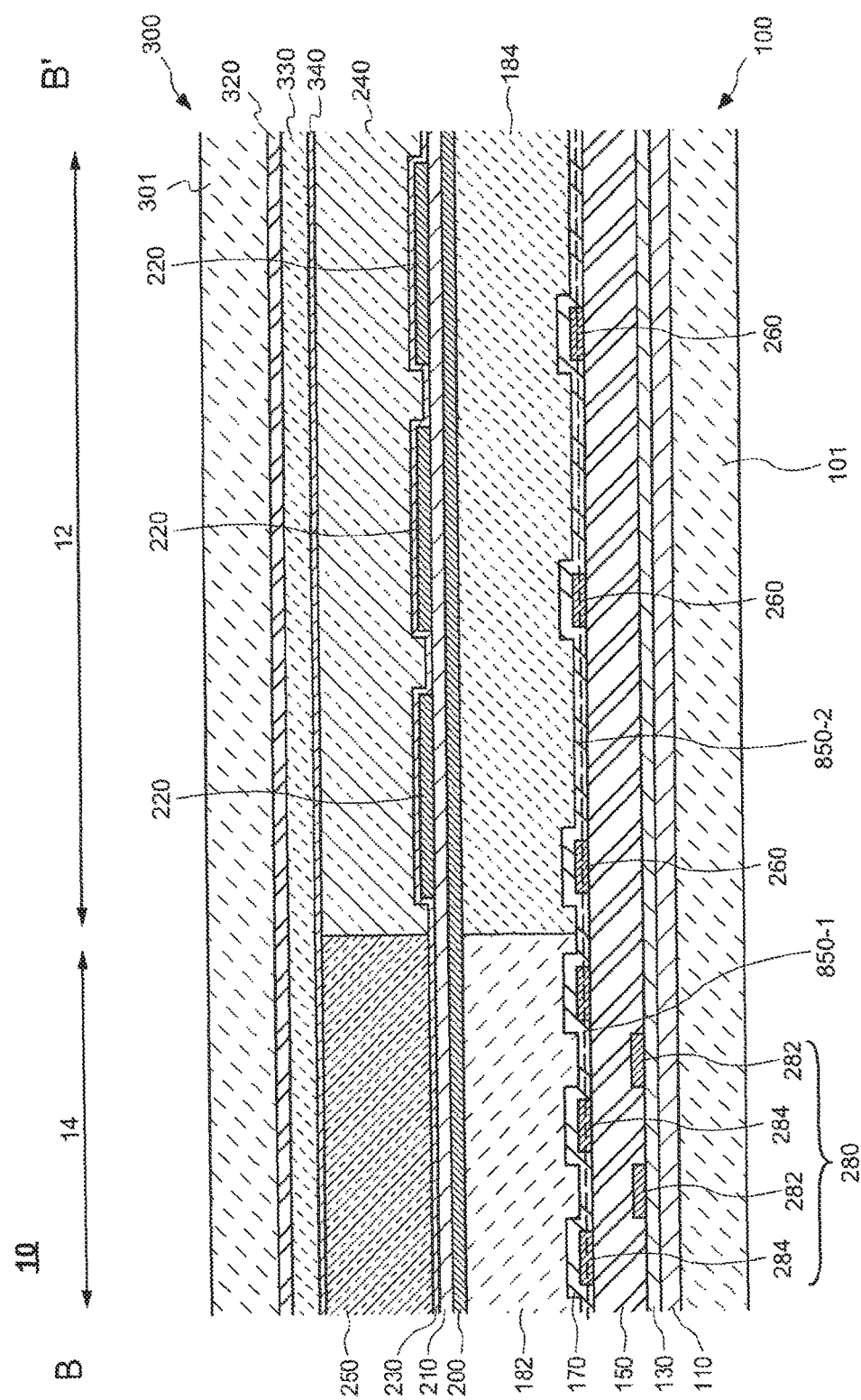
FIG. 5 is a cross-sectional view of a liquid crystal region and a sealant in a bendable section of the liquid crystal display device in an embodiment according to the present invention.

With reference to FIG. 5, a neutral face of the bendable section 700 in the case where the display device 10 in this embodiment is bended to the side of the array substrate 100 will be described. FIG. 5 is a cross-sectional view of the liquid crystal region 12 and the seal region 14 in the bendable section 700 of the display device 10 in embodiment 1 according to the present invention. The cross-sectional structure of the display device 10 shown in FIG. 5 is similar to the cross-sectional structure of the conventional display device 90Z shown in FIG. 12. Unlike the display device 90Z, the display device 10 includes a resin insulating layer 182 and a resin insulating layer 184 provided between the inorganic insulating layer 170 and the common electrode 200. The resin insulating layer 182 and the resin insulating layer 184 are provided closer to the resin substrate 301 than the wires 280 and the source wires 260. The wires 280 include the wires 282 formed in the same gate layer (first wiring layer) as the gate wires 270 and also includes wires 284 formed in the same source layer (second wiring layer) as the source wires 260.

The resin insulating layer 182 (first insulating layer) is softer than the resin insulating layer 184 (second insulating layer). Namely, the resin insulating layer 182 has a Young's modulus lower than that of the resin insulating layer 184. The resin insulating layer 182 and the resin insulating layer 184 are both in contact with the inorganic insulating layer 170 (first layer). Namely, the resin insulating layer 182 and the resin insulating layer 184 are in the same layer. The resin insulating layer 182 and the resin insulating layer 184 are formed of different materials from each other. In other words, the material and the Young's modulus of the resin insulating layer 182 (first insulating layer) in contact with the inorganic insulating layer 170 (first layer) in the seal region 14, and the material and the Young's modulus of the resin insulating layer 184 (second insulating layer) in contact with the inorganic insulating layer 170 in the liquid crystal region 12, are different from each other.

In the case where a resin insulating layer 180Z is provided both in the liquid crystal region 12Z and the seal region 14Z as in the conventional structure shown in FIG. 12, the neutral face 855Z-1 in the seal region 14Z is closer to the counter substrate 300Z than the neutral face 855Z-2 in the liquid crystal region 12Z. By contrast, in the structure of FIG. 5, the Young's modulus of the resin insulating layer 182 is lower than that of the resin insulating layer 184. Therefore, in the seal region 14, the components located closer to the resin substrate 301 than the wires 280 have a rigidity lower than that of the corresponding components in the conventional structure shown in FIG. 12. Thus, a neutral face 850-1 in the seal region 14 is closer to the resin substrate 101 than in the conventional structure shown in FIG. 12. In the conventional structure shown in FIG. 12, the neutral face 855Z-1 is located closer to the resin substrate 301Z than the wires 280Z. The neutral face 855Z-1 is made closer to the wires 280Z by the arrangement shown in FIG. 5 made on a layer located closer to the resin substrate 301 than the wires 280 (e.g., resin insulating layers 182 and 184), more specifically, by the arrangement by which the Young's modulus of a layer in the seal region 14 (e.g., resin insulating layer 182) is made lower than that of a layer in the liquid crystal region 12 (e.g., resin insulating layers 184).

In order to make the neutral face 850-1 in the seal region 14 closer to the wires 282, an arrangement is made on a layer located closer to the resin substrate 301 than the wires 282, such that the Young's modulus of a part of the layer in the seal region 14 is lower than that of a part of the layer in the liquid crystal region 12. In order to make the neutral face 850-1 in the seal region 14 closer to the wires 284, an arrangement is made on a layer located closer to the resin substrate 301 than the wires 284, such that the Young's modulus of a part of the layer in the seal region 14 is lower than that of a part of the layer in the liquid crystal region 12.

In FIG. 5, the neutral face 850-1 and the neutral face 850-2 are located at the same position in a thickness direction of the display device 10. These neutral faces do not need to be located at the same position. In FIG. 5, the neutral face 850-1 and the neutral face 850-2 are respectively located at the positions of the wires 284 and the source wires 260. These neutral faces are not limited to being located in this manner. For example, the neutral face 850-1 may be located between the wires 284 and the wires 282 (at the center of the interlayer insulating layer 150 in the thickness direction of the display device 10). With any of the above-described arrangements, the stress applied on the wires 284 and the stress applied on the wires 282 are made equal to each other.

As described above, the display device 10 in embodiment 1 includes the resin insulating layer 182 and the resin insulating layer 184 formed of materials that are different in Young's modulus. This allows the position of the neutral face 850-2 in the liquid crystal region 12 and the position of the neutral face 850-1 in the seal region 14 to be adjusted independently. As a result, the difference between the stress applied on the source wires 260 and the stress applied on the wires 280 is decreased. Thus, a fault such as wire breakage or the like is suppressed.

Embodiment 2

Figure 6A:
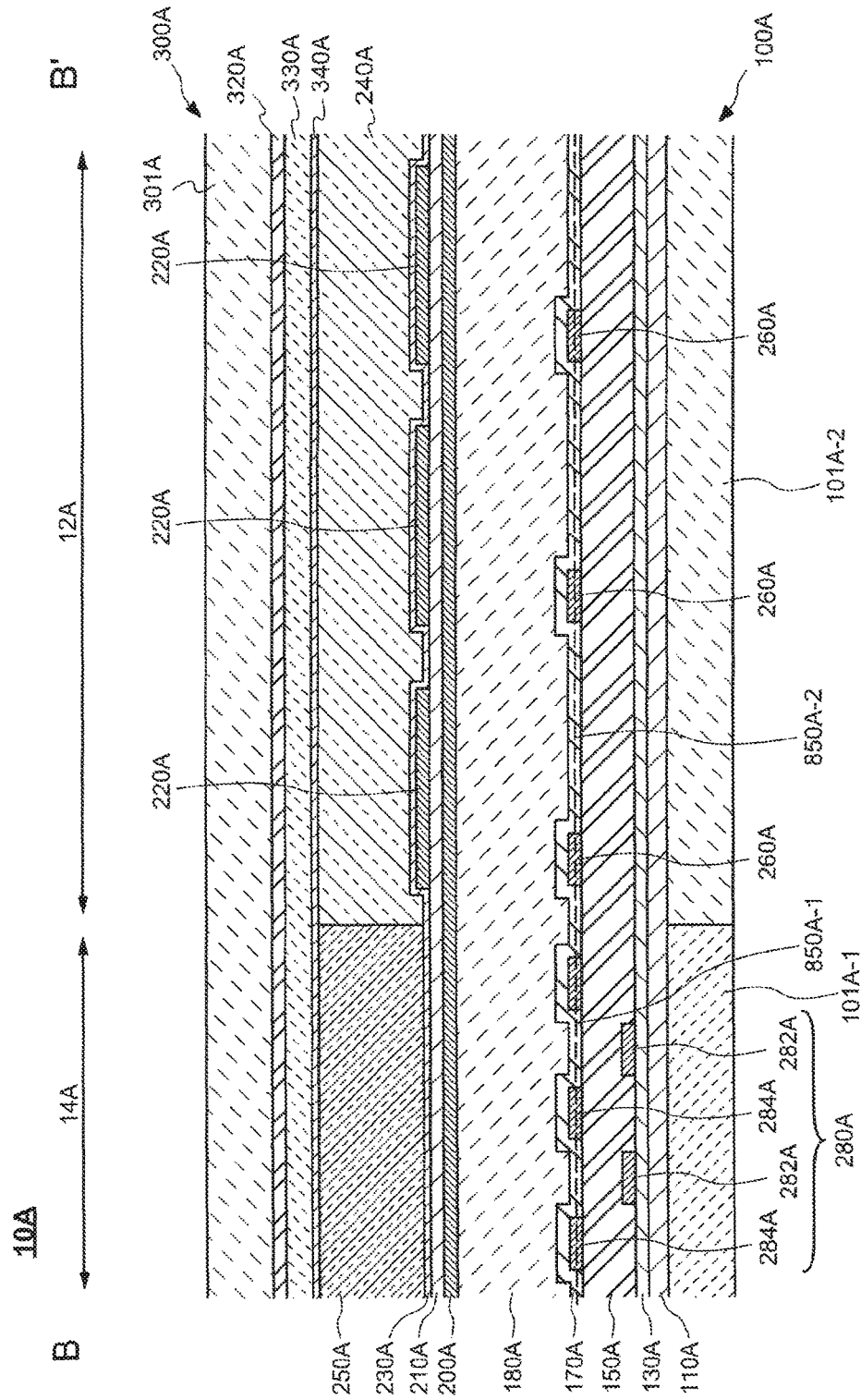
FIG. 6A is a cross-sectional view of a liquid crystal region and a seal region of a bendable section of a liquid crystal display device in an embodiment according to the present invention.

With reference to FIG. 6A, an overview of a liquid crystal display device in embodiment 2 according to the present invention will be described. A display device 10A in embodiment 2 is similar to the display device 10 in embodiment 1. Unlike in the display device 10, in the display device 10A, the position of a neutral face is adjusted by the structure of a resin substrate, not by the structure of the resin insulating layer. In the following description, the above-described difference of embodiment 2 from embodiment 1 will be mainly described.

FIG. 6A is a cross-sectional view of a liquid crystal region 12A and a seal region 14A in a bendable section of the display device 10A (liquid crystal display device) in embodiment 2. As shown in FIG. 6A, an array substrate 100A includes a resin substrate 101A-1 (corresponding to the first insulating layer) and a resin substrate 101A-2 (corresponding to the second insulating layer). The resin substrate 101A-1 is harder than the resin substrate 101A-2. Namely, the resin substrate 101A-1 has a Young's modulus higher than that of the resin substrate 101A-2. The resin substrate 101A-1 and the resin substrate 101A-2 are both in contact with an underlying insulating layer 110A (first layer). Namely, the resin substrate 101A-1 and the resin substrate 101A-2 are in the same layer.

In the structure of FIG. 6A, the Young's modulus of the resin substrate 101A-1 is higher than that of the resin substrate 101A-2. Therefore, in the seal region 14A, the resin substrate 101A-1 and the components located closer to the resin substrate 101A-1 than wires 280A have a rigidity higher than that of the corresponding components in the conventional structure shown in FIG. 12. Thus, a neutral face 850A-1 in the seal region 14A is closer to the resin substrate 101A-1 than in the conventional structure shown in FIG. 12. In the conventional structure shown in FIG. 12, the neutral face 855Z-1 is located closer to the resin substrate 301Z than the wires 280Z. The neutral face 855Z-1 is made closer to the wires 280Z by the arrangement shown in FIG. 6A made on a layer among the components located on the side of the resin substrate 101A-1 (including the resin substrate 101A-1) with respect to the wires 280 (e.g., resin substrates 101A-1 and 101A-2), more specifically, by the arrangement by which the Young's modulus of a part of the layer in the seal region 14A (e.g., resin substrate 101A-1) is made higher than that of a part of the layer in the liquid crystal region 12A (e.g., resin substrate 101A-2).

In order to make the neutral face 850A-1 in the seal region 14A closer to the wires 282A, an arrangement is made on a layer among the components located on the side of the resin substrate 101A-1 (including the resin substrate 101A-1) with respect to the wires 282A, such that the Young's modulus of a part of the layer in the seal region 14A is higher than that of a part of the layer in the liquid crystal region 12A. In order to make the neutral face 850A-1 in the seal region 14A closer to wires 284A, an arrangement is made on a layer among the components located on the side of the resin substrate 101A-1 (including the resin substrate 101A-1) with respect to the wires 284A, such that the Young's modulus of a part of the layer in the seal region 14A is higher than that of a part of the layer in the liquid crystal region 12A.

In the structure shown in FIG. 6A, the resin insulating layer 180A may be replaced with the resin insulating layer 182 and the resin insulating layer 184 shown in FIG. 5.

Figure 6B:
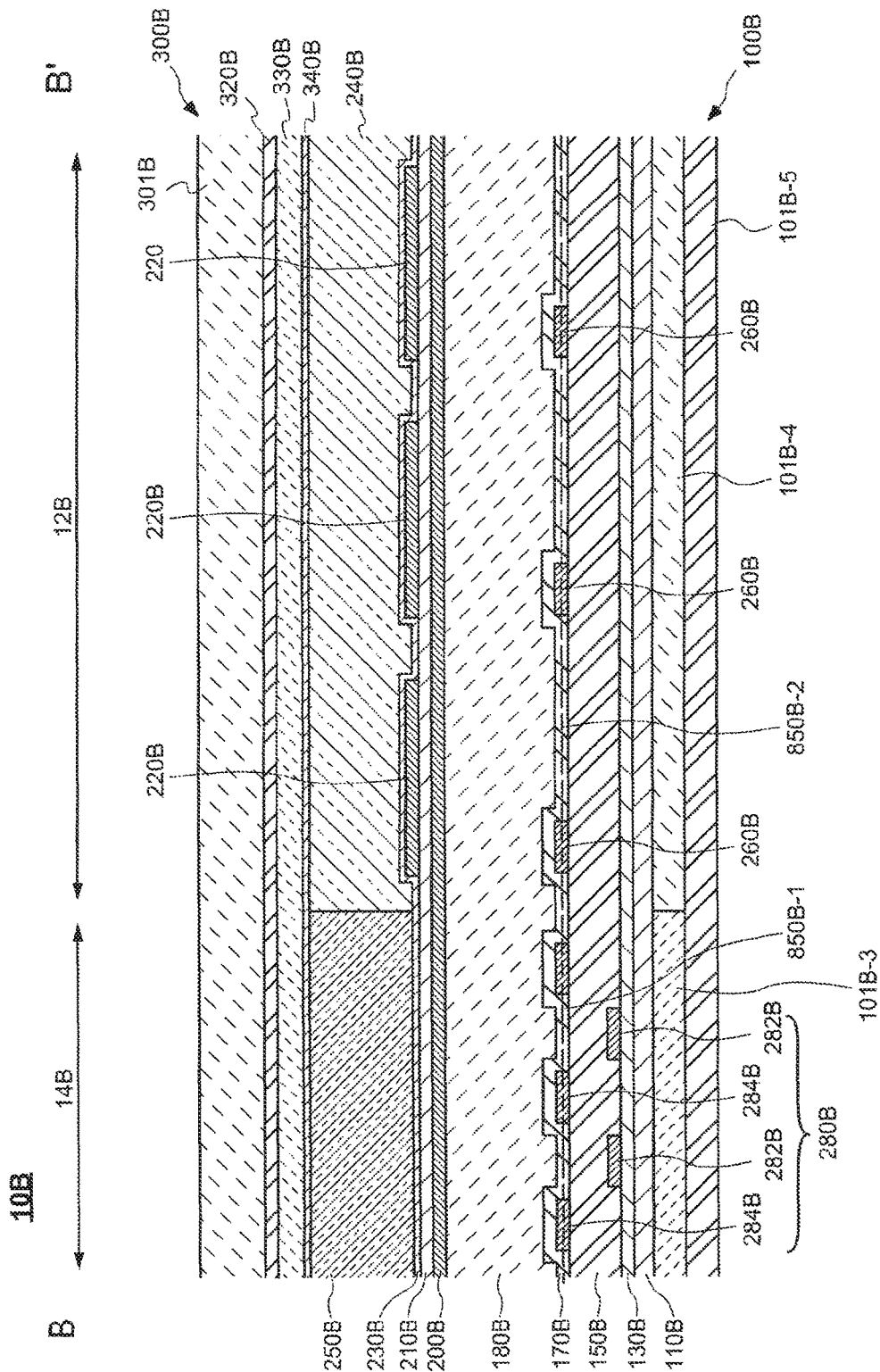
FIG. 6B is a cross-sectional view of a liquid crystal region and a seal region of a bendable section of a liquid crystal display device in an embodiment according to the present invention.

With reference to FIG. 6B, another example in which a resin substrate having different Young's moduli in a liquid crystal region 12B and a seal region 14B will be described. The structure shown in FIG. 6B is similar to the structure shown in FIG. 6A, but is different from the structure shown in FIG. 6A in the structure of the substrate. As shown in FIG. 6B, a resin substrate 101B-5 is continuous from the liquid crystal region 12B to the seal region 14B. In the seal region 14B, a resin layer 101B-3 (first insulating layer) is provided on the resin substrate 101B-5. In the liquid crystal region 12B, a resin layer 101B-4 (second insulating layer) is provided on the resin substrate 101B-5. The resin layer 101B-3 has a Young's modulus higher than that of the resin layer 101B-4. In this manner, a resin substrate having different Young's moduli in the liquid crystal region 12B and the seal region 14B may be realized by such a stack structure. For example, the resin layer 101B-5 may be formed of polyimide, and the resin layers 101B-3 and 101B-4 may be formed of flat films having different Young's moduli from each other. The flat films alleviate the ruggedness at a surface of the resin layer 101B-5. The flat films may be formed of, for example, an acrylic resin. The resin layer 101B-5 may be referred to as a "first layer".

Embodiment 3

Figure 7A:
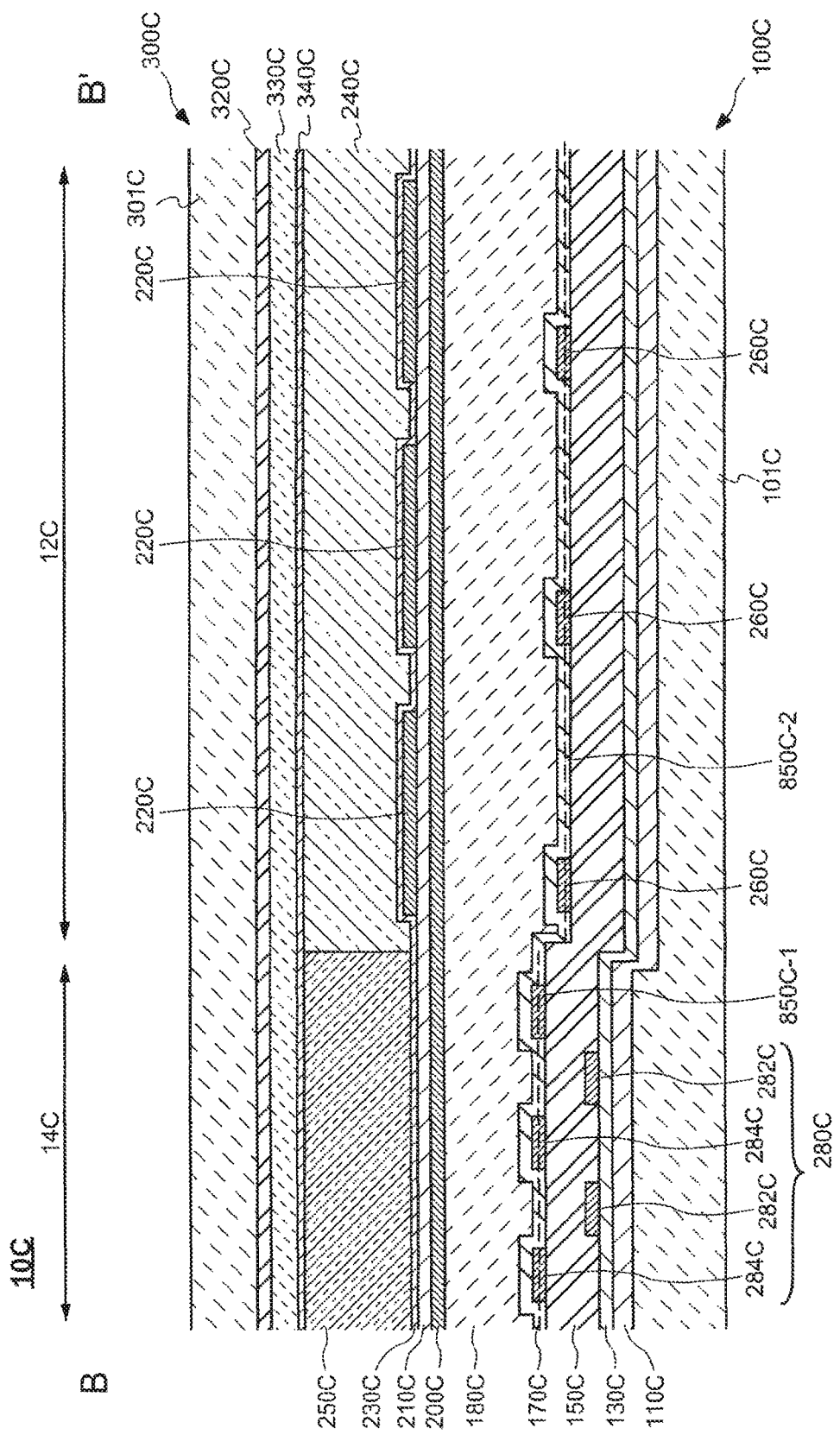
FIG. 7A is a cross-sectional view of a liquid crystal region and a seal region of a bendable section of a liquid crystal display device in an embodiment according to the present invention.

With reference to FIG. 7A, an overview of a liquid crystal display device in embodiment 3 according to the present invention will be described. A display device 10C in embodiment 3 is similar to the display device 10A in embodiment 2. Unlike in the display device 10A, in the display device 100, the position of a neutral face is adjusted by the thickness of a resin substrate, not by the Young's modulus of the resin substrate. In the following description, the above-described difference of embodiment 3 from embodiment 2 will be mainly described.

FIG. 7A is a cross-sectional view of a liquid crystal region 12C and a seal region 14C in a bendable section of the display device 10C (liquid crystal display device) in embodiment 3 according to the present invention. As shown in FIG. 7A, a resin substrate 101C has a thickness larger in the seal region 14C than in the liquid crystal region 12C. In other words, the thickness of the resin substrate 101C in contact with an underlying insulating layer 110C (first layer) in the seal region 14C is larger than the thickness of the resin substrate 101C in contact with the underlying insulating layer 110C (first layer) in the liquid crystal region 12C.

In the structure of FIG. 7A, the thickness of the resin substrate 101C in the seal region 14C (this part of the resin substrate 101C corresponds to the first insulating layer) is larger than the thickness of the resin substrate 101C in the liquid crystal region 12C (this part of the resin substrate 101C corresponds to the second insulating layer). Therefore, in the seal region 14C, the resin substrate 101C and the components located closer to the resin substrate 101C than wires 280C have a rigidity hither than that of the corresponding components in the conventional structure shown in FIG. 12. Thus, a neutral face 850C-1 in the seal region 14C is closer to the resin substrate 101C than in the conventional structure shown in FIG. 12. In the conventional structure shown in FIG. 12, the neutral face 855Z-1 is located closer to the resin substrate 301Z than the wires 280Z. The neutral face 855Z-1 is made closer to the wires 280Z by the arrangement shown in FIG. 7A made on a layer among the components located on the side of the resin substrate 101C (including the resin substrate 101C) with respect to the wires 280C (e.g., resin substrate 101C), more specifically, by the arrangement by which the thickness of a part of the layer in the seal region 14C is made larger than that of a part of the layer in the liquid crystal region 12C.

As shown in FIG. 7A, the underlying insulating layer 110C, an inorganic insulating layer 170C and the components provided between the underlying insulating layer 110C and the inorganic insulating layer 170C are each formed of an inorganic material. Therefore, the stepped portion in the resin substrate 101C is reflected on the inorganic insulating layer 170C. Thus, a part of the inorganic insulating layer 170C in the seal region 14C is closer to a resin substrate 301C than a part of the inorganic insulating layer 170C in the liquid crystal region 12C. In order to alleviate the stepped portion in the inorganic insulating layer 170C, a thickness of a resin insulating layer 180C in the seal region 14C, which is referred to as a "third insulating layer", is smaller than a thickness of a resin insulating layer 180C in the liquid crystal region 12C, which is referred to as a "fourth insulating layer". Therefore, in the seal region 14C, the components closer to the resin substrate 301C than wires 280C have a rigidity lower than that of the corresponding components in the conventional structure shown in FIG. 12. Thus, a neutral face 850C-1 in the seal region 14C is still closer to the resin substrate 101C than in the conventional structure shown in FIG. 12.

Figure 7B:
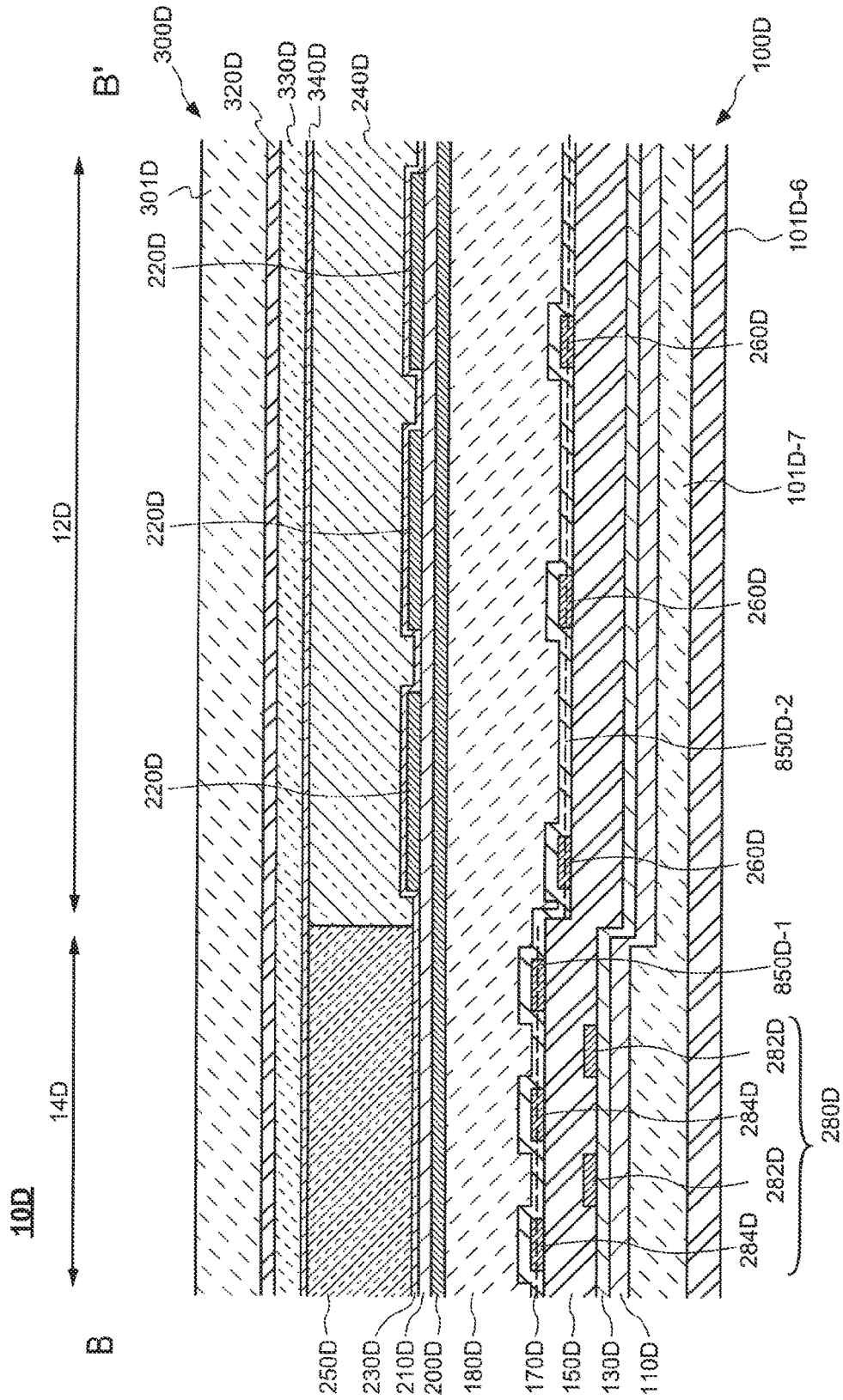
FIG. 7B is a cross-sectional view of a liquid crystal region and a seal region of a bendable section of a liquid crystal display device in an embodiment according to the present invention.

With reference to FIG. 7B, another example in which a resin substrate having different thicknesses in a liquid crystal region 12D and a seal region 14D will be described. The structure shown in FIG. 7B is similar to the structure shown in FIG. 7A. Unlike in the structure shown in FIG. 7A, in the structure shown in FIG. 7B, a resin substrate 101D-6 and a resin substrate 101D-7 are stacked on each other. As shown in FIG. 7B, the resin substrate 101D-6 is continuous from the liquid crystal region 12D to the seal region 14D with the same thickness. On the resin substrate 101D-6, the resin substrate 101D-7 is provided. The resin substrate 101D-7 has a thickness larger in the seal region 14D than in the liquid crystal region 12D. The resin substrate 101D-7 is continuous from the liquid crystal region 12D to the seal region 14D. A part of the resin substrate 101D-7 in the seal region 14D corresponds to the first insulating layer, and a part of the resin substrate 101D-7 in the liquid crystal region 12D corresponds to the second insulating layer. An underlying insulating layer 110D provided on the resin substrate 101D-7 is the first layer. The resin substrate 101D-7 does not need to be continuous from the liquid crystal region 12D to the seal region 14D, and the part of the resin substrate 101D-7 in the seal region 14D and the part of the resin substrate 101D-7 in the liquid crystal region 12D may be formed of different materials or by different methods. In this manner, a resin substrate having different thicknesses in the liquid crystal region 12D and the seal region 14D may be realized by such a stack structure. For example, the resin substrate 101D-6 may be formed of polyimide, and the resin substrate 101D-7 may be formed of a flat film having different thicknesses in different parts.

In embodiments 1 to 3, the insulating layer in the first substrate 100 is used to adjust the position of the neutral face in the seal region. The present invention is not limited to such a form. The Young's modulus or the thickness of the insulating layer in the second substrate 300 may be adjusted to adjust the position of the neutral face in the seal region.

Embodiment 4

Figure 8:
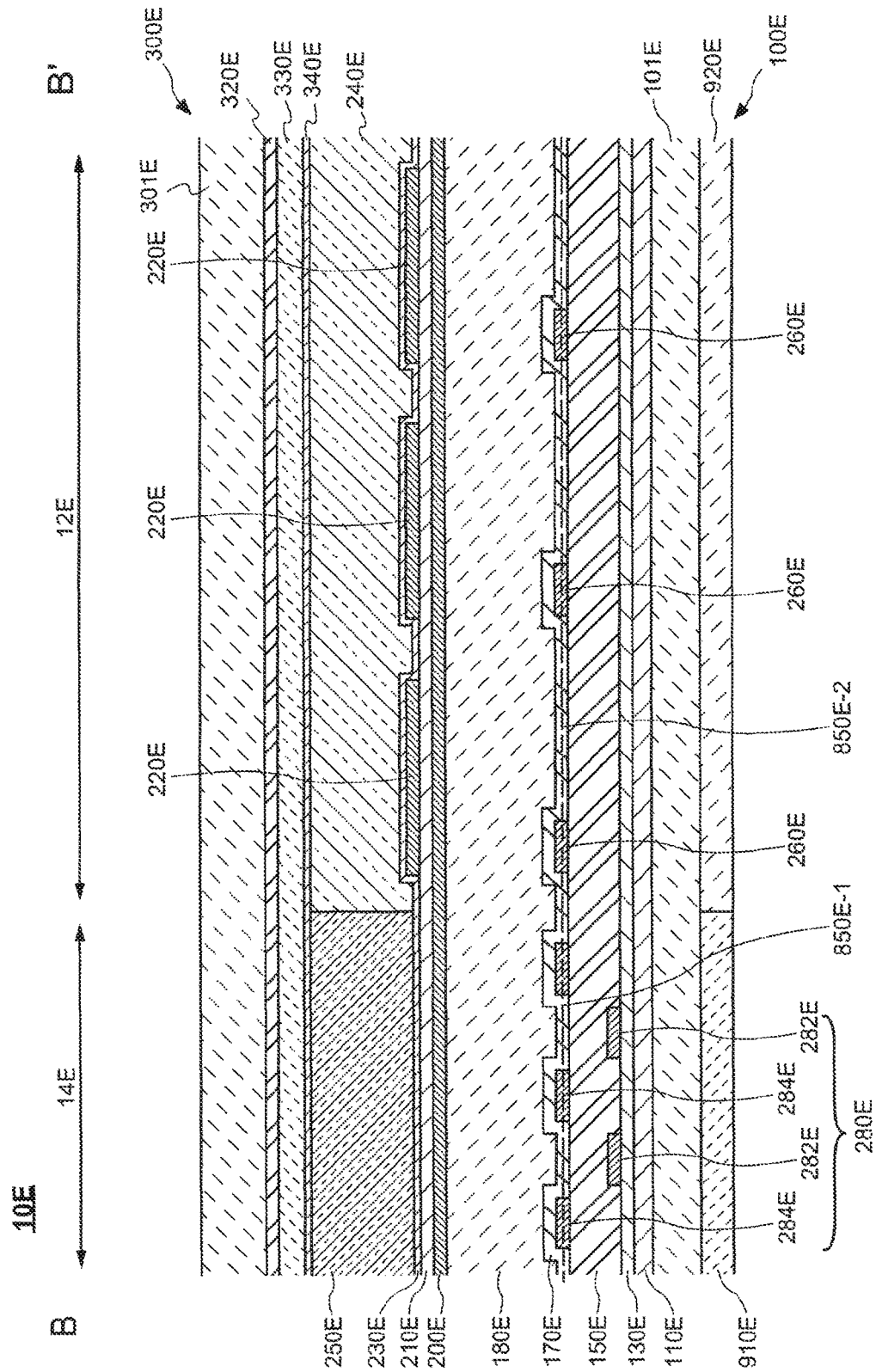
FIG. 8 is a cross-sectional view of a liquid crystal region and a seal region of a bendable section of a liquid crystal display device in an embodiment according to the present invention.

With reference to FIG. 8, an overview of a liquid crystal display device in embodiment 4 according to the present invention will be described. A display device 10E in embodiment 4 is similar to the display device 10A in embodiment 2. Unlike the display device 10A, the display device 10E includes a first insulating layer 910E and a second insulating layer 920E provided on the side opposite to an underlying insulating layer 110E with respect to a resin substrate 101E. In the following description, the above-described difference of embodiment 4 from embodiment 2 will be mainly described. The first insulating layer 910E is provided in a seal region 14E. The second insulating layer 920E is provided in the liquid crystal region 12E. The first insulating layer 910E is harder than the second insulating layer 920E. Namely, the first insulating layer 910E has a Young's modulus higher than that of the second insulating layer 920E. The first insulating layer 910E and the second insulating layer 920E are both in contact with the resin substrate 101E. Namely, the first insulating layer 910E and the second insulating layer 920E are in the same layer. The resin substrate 101E may be referred to as a "first layer". In this manner, a resin substrate having different Young's moduli in the liquid crystal region 12E and the seal region 14E may be realized by such layers provided on the side opposite to the underlying insulating layer 110E with respect to the resin substrate 101E.

Embodiment 5

Figure 9:
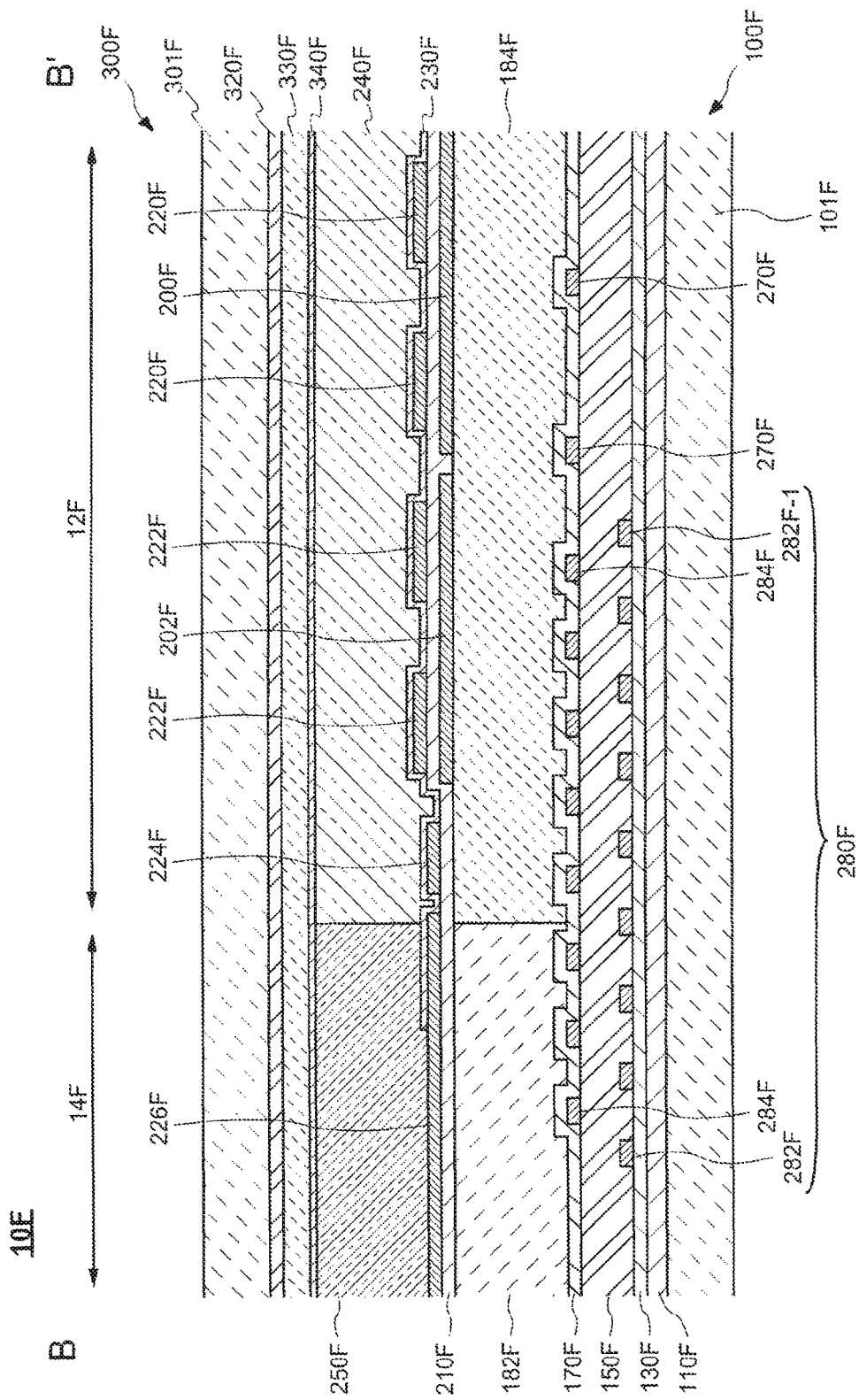
FIG. 9 is a cross-sectional view of a liquid crystal region and a seal region of a bendable section of a liquid crystal display device in an embodiment according to the present invention.

With reference to FIG. 9, a layer structure of the liquid crystal region 12F and the vicinity thereof will be described. A display device 10F in embodiment 5 is similar to the display device 10 in embodiment 1. The display device 10F is different from the display device 10 in the layer structure of a seal region 14F and the layer structure of the liquid crystal region 12F in the vicinity of the seal region 14F. In the following description, the above-described difference of embodiment 5 from embodiment 1 will be mainly described.

FIG. 9 is a cross-sectional view showing the liquid crystal region 12F and the seal region 14F of a bendable section of the display device 10 (liquid crystal display device) in embodiment 5 according to the present invention. As shown in FIG. 9, in the liquid crystal region 12F, a shield electrode 202F and dummy pixel electrodes 222F are provided closer to the seal region 14F than a common electrode 200F and pixel electrodes 220F. For example, in the case where the pixel electrodes 220F are arrayed in a matrix, the dummy pixel electrodes 222F may enclose the pixel electrodes 220F. Similarly, the shield electrode 202F may enclose the common electrode 200F. The shield electrode 202F is in the same layer as the common electrode 200F. The dummy pixel electrodes 222F are in the same layer as the pixel electrodes 220F. The shield electrode 202F and the dummy pixel electrodes 222F are formed of a transparent conductive layer, like the common electrode 200F and the pixel electrodes 220F. The shield electrode 202F is electrically insulated from the common electrode 200F. The dummy pixel electrodes 222F are electrically insulated from the shield electrode 202F. The shield electrode 202F is located to overlap, as seen in a plan view, a wire 280F, among wires 280F, located closest to the pixel electrodes 220F (in FIG. 9, wire 280E-1). The shield electrode 202F is not limited to being located at the above-described position.

The shield electrode 202F has a function of blocking an electric field formed by an electric current flowing in the wires 280F. The shield electrode 202F is supplied with a potential same as the potential supplied to, for example, the common electrode 200F. The shield electrode 202F may be supplied with a potential same as the potential supplied to the dummy pixel electrodes 222F. The shield electrode 202F protects wires 284F and the like located below the shield electrode 202F against external electrostatic charges.

The dummy pixel electrodes 222F are pixel electrodes that do not contribute to image display provided in a display region of the display device 10F. In the case where the pixel electrodes are provided in a matrix pattern as shown in FIG. 1, the size of the pixel electrodes in an outermost area may be different from the size of the pixel electrodes in an inner area due to the influence of, for example, the difference in the amount of light used for exposure in a photolithography step or the difference in the etchant concentration in an etching step (in the case of dry etching, the difference in the plasma density). The dummy pixel electrodes 222F are provided closer to the seal region 14F than the pixel electrodes 220F, so that the size precision or the size uniformity of the pixel electrodes 220F contributing image display is improved.

The dummy pixel electrodes 222F may be supplied with a constant potential. Potentials supplied to the dummy pixel electrodes 222F may be scanned sequentially. In the case where the potentials are scanned sequentially, the potentials supplied to the dummy pixel electrodes 220F may be scanned at the same timing as the potentials supplied to the pixel electrodes 220F. The potentials supplied to the dummy pixel electrodes 220F are scanned, so that impurity ions that have moved to an end of the liquid crystal region 12F, among impurity ions generated in the liquid crystal region 12F, are further moved to the seal region 14F outer to the liquid crystal region 12F.

A trap electrode 224F is provided still closer to the seal region 14F than the shield electrode 202F and the dummy pixel electrodes 222F. The trap electrode 224F is provided in the same layer as the pixel electrodes 220F and the dummy pixel electrodes 222F. The trap electrode 224F is formed of a transparent conductive layer, like the pixel electrodes 220F and the dummy pixel electrodes 222F. The trap electrode 224F may enclose the pixel electrodes 220F and the dummy pixel electrodes 222F.

The trap electrode 224F is supplied with a positive or negative constant potential. In the case of being supplied with a positive constant potential, the trap electrode 224F traps impurity ions having a negative polarity. By contrast, in the case of being supplied with a negative constant potential, the trap electrode 224F traps impurity ions having a positive polarity. In the case where the wires 280F are provided below the trap electrode 224F, the potential supplied to the trap electrode 224F may be equal to the potential supplied to the wires 280F. Such an arrangement improves the function of the trap electrode 224F of trapping the impurity ions.

A shield electrode 226F is provided outer to the trap electrode 224F, more specifically, in the seal region 14F and on an outer side of the seal region 14F. The shield electrode 226F is provided in the same layer as the pixel electrodes 220F, the dummy pixel electrodes 222F, and the trap electrode 224F. The shield electrode 226F is formed of a transparent conductive layer. The shield electrode 226F is provided between an insulating layer 210F and a sealant 250F, so that the adherence of the sealant 250F to an array substrate 100F is improved. In order to further improve the adherence of the sealant 250F to an array substrate 100F, the shield electrode 226F may have a rugged surface as shown in a cross-sectional view.

Embodiment 6

Figure 10:
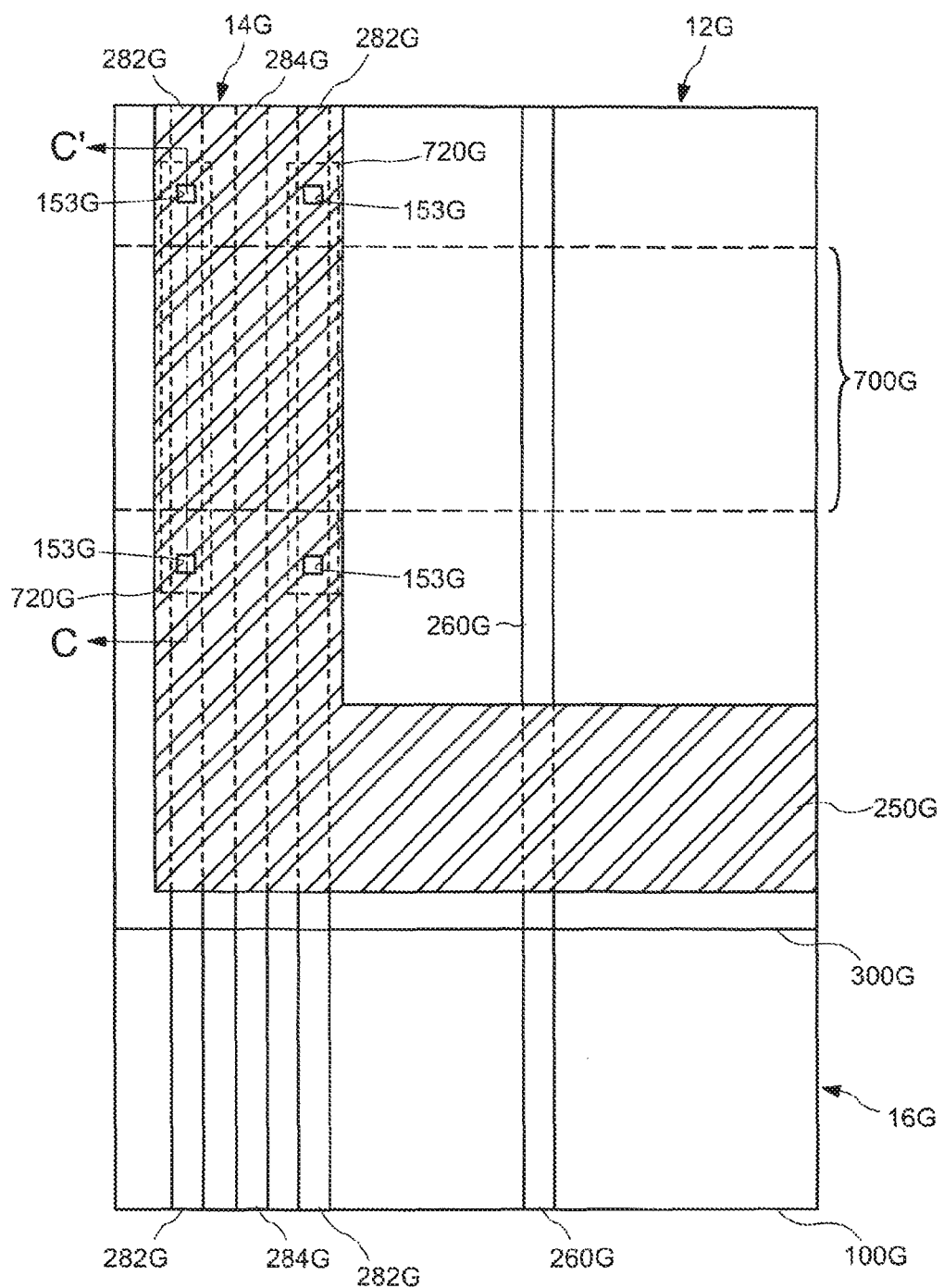
FIG. 10 is a partial enlarged plan view of a liquid crystal display device in an embodiment according to the present invention.
Figure 11:
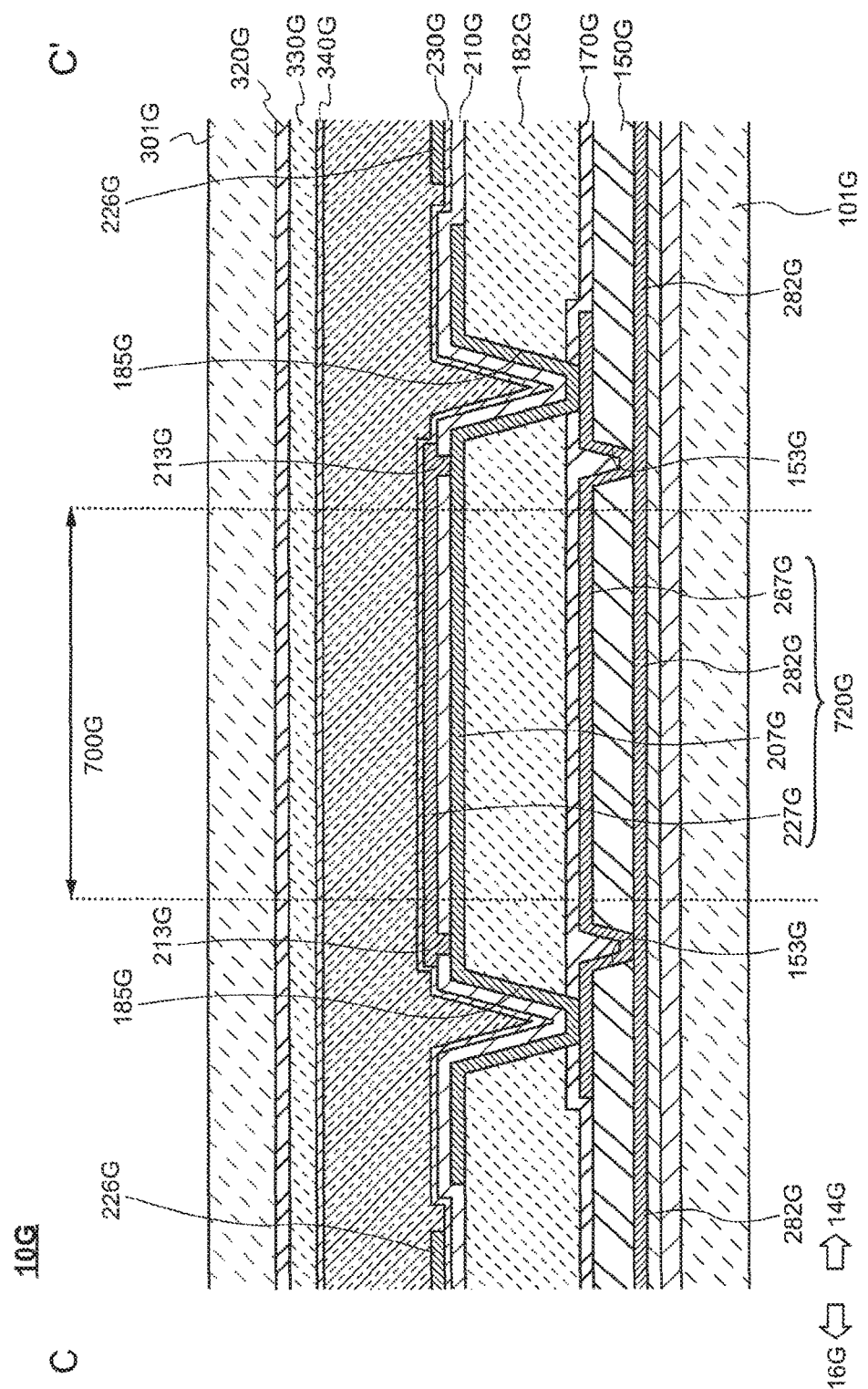
FIG. 11 is a cross-sectional view showing a wiring structure of a bendable section of the liquid crystal display device in an embodiment according to the present invention.

With reference to FIG. 10 and FIG. 11, a wiring structure of a bendable section 700G will be described. A display device 10G in embodiment 6 according to the present invention has a layer structure substantially the same as that of the display device 10 in embodiment 1. FIG. 10 is a partial enlarged plan view of the display device 10G (liquid crystal display device) in embodiment 6 according to the present invention. FIG. 11 is a cross-sectional view showing the wiring structure of the bendable section 700G in the display device 10G (liquid crystal display device) in embodiment 6 according to the present invention. As shown in FIG. 10, a source wire 260G extends from a liquid crystal region 12G toward a terminal region 16G via a seal region 14G. Similarly, wires 282G and a wire 284G extend from the seal region 14G toward the terminal region 16G. The wires 282G and the wire 284G extend in the same direction as the source wire 260G. The source wires 260G, the wires 282G and the wire 284G respectively correspond to the source wire 260, the wires 282 and the wire 284 in FIG. 5.

The source wire 260G (first wire) and the wire 284G are formed in the source layer (second wiring layer) described above with reference to FIG. 5. The wires 282G (one part of second wire) are formed in the gate layer (first wiring layer) described above with reference to FIG. 5. The wires 282G are connected with the source layer (a first bypass wire 267G (another part of second wire) formed in the second wiring layer shown in FIG. 11) in the bendable section 700G via openings 153G. In other words, in the bendable section 700G, the wires 282G are included in a stack wire 720G described below. In still other words, the wires 282G formed in the gate layer are connected, in the bendable section 700G, with a wire formed in a layer different from the gate layer. As shown in FIG. 10, the openings 153G through which the wires 282G and the source layer are connected to each other are provided in regions having the bendable section 700G therebetween. In other words, the bendable section 700G is between the openings 153G.

As shown in FIG. 11, the wires 282G are a part of the stack wire 720G in the bendable section 700G. FIG. 11 is a cross-sectional view taken along line C-C' in FIG. 10, namely, a phantom line extending in the direction in which the wires 282G extend. As shown in FIG. 11, the stack wire 720G includes a first bypass wire 267G, a second bypass wire 207G and a third bypass wire 227G, in addition to the wires 282G. The first bypass wire 267G is provided in a layer corresponding to, for example, the source layer in which the source electrode 160 of the thin film transistor 20 shown in FIG. 2 is provided or in which the source wires 260 shown in FIG. 5 are provided. The second bypass wire 207G is provided in, for example, a layer corresponding to a common electrode layer in which the common electrode 200 shown in FIG. 2 and FIG. 5 is provided. The third bypass wire 227G is provided in a layer corresponding to a pixel electrode layer in which the pixel electrodes 220 shown in FIG. 2 and FIG. 5 are provided. In other words, the wires 267G (another part of second wire) in the bendable section 700G are above the wires 282G (the one part of second wire) between the bendable section 700G and the terminal region 16G.

The wires 282G extending from the terminal region 16G toward the seal region 14G are connected with the first bypass wire 267G via the openings 153G, are connected with the second bypass wire 207G via openings 185G, and are connected with the third bypass wire 227G via openings 213G, before the bendable section 700G. The same stack via structure is provided beyond the bendable section 700G. Beyond this stack via structure, the stack structure is not provided, and the wires 282G extend as a single layer. Outside the bendable section 700G, the third bypass wire 227G in the pixel electrode layer acts as the shield electrode 226G, which is substantially the same as the shield electrode 226F in FIG. 9. Namely, in the seal region 14G, the pixel electrode layer includes a part acting as the shield electrode 226G and a part acting as the third bypass wire 227G. In the structure shown in FIG. 11, only the wires 282G are connected with the bypass wires as described above. Alternatively, the source wire 260G and the wire 284G may be connected with the bypass wires, like the wires 282G.

As described above, the wires passing the bendable section 700G are provided in a stack structure, so that the wires are suppressed by being broken by a flexural stress. In the bendable section 700G, a neutral face in the seal region 14G tends to be moved upward than a neutral face in the liquid crystal region 14G. Namely, in the bendable section 700G, the wires 282G in the gate layer, which is one of the lowest layers, may be subjected to a strong stress. In order to avoid this, the wires 282G are connected with the first bypass wire 267G, the second bypass wire 207G and the third bypass wire 227G, which are above the wire 282G, via the openings 153G, 185G and 213G. With such an arrangement, even if the wires 282G are broken in the bendable section 700G due to the flexural stress in the bendable section 700G, the conduction of the stack wire 720G is kept via any one of the first bypass wire 267G, the second bypass wire 207G and the third bypass wire 227G in the bendable section 700G. Namely, the stack wire 720G shown in FIG. 11 provides a wiring structure having a high durability against the flexural stress in the seal region 14G.

The present invention is not limited to any of the above-described embodiments. The above embodiments may be modified appropriately without departing from the gist of the present invention.

What is claimed is:

1. A display device, comprising:
   a flexible first substrate including a seal region overlapping a sealant and a liquid crystal region overlapping a liquid crystal layer;
   a flexible second substrate;
   a first insulating layer;
   a second insulating layer;
   the liquid crystal layer between the first substrate and the second substrate;
   the sealant sealing the liquid crystal layer and bonding the first substrate and the second substrate to each other;
   a first wire extending in a first direction in the liquid crystal region; and
   a second wire extending in the first direction in the seal region;
   wherein
   the display device has a bendable section in a part of the sealant,
   the bendable section is bendable around a second direction, crossing the first direction, as an axis,
   the first substrate includes a terminal region outer to the seal region,
   the first insulating layer overlaps with the seal region,
   the second insulating layer overlaps with the display region,
   the first insulating layer and the second insulating layer exist in the same layer,
   the first insulating layer and the second insulating layer have different thicknesses or are formed of different materials from each other,
   the first wire and the second wire are electrically connected with the terminal region, and
   the second wire in the bendable section is closer to the second substrate than the second wire between the bendable section and the terminal region.

2. The display device according to claim 1, wherein the first insulating layer and the second insulating layer have different Young's moduli from each other.

3. The display device according to claim 1,
   wherein
   the first insulating layer and the second insulating layer are closer to the first substrate than the first wire and the second wire, and
   the first insulating layer has a Young's modulus higher than a Young's modulus of the second insulating layer.

4. The display device according to claim 1,
   wherein
   the first insulating layer and the second insulating layer are closer to the second substrate than the first wire and the second wire, and
   the first insulating layer has a Young's modulus lower than a Young's modulus of the second insulating layer.

5. The display device according to claim 1, further comprising a pixel electrode or a common electrode in the liquid crystal region;
   wherein the second wire is in the same layer as the pixel electrode or the common electrode.

* * * * *